United States Patent [19]
Davis

[11] Patent Number: 5,847,287
[45] Date of Patent: Dec. 8, 1998

[54] ELECTROMAGNETIC FLOWMETER WITH SELF-SEALING ELECTRODES

[75] Inventor: James W. Davis, New Britain, Pa.

[73] Assignee: Elsag International N.V., Amsterdam, Netherlands

[21] Appl. No.: 785,094

[22] Filed: Jan. 21, 1997

[51] Int. Cl.⁶ ..................................................... G01F 1/58
[52] U.S. Cl. .................................. 73/861.15; 73/861.12; 73/861.08
[58] Field of Search ................................. 73/861, 861.08, 73/861.11, 861.12, 861.13, 861.14, 861.15

[56] References Cited

U.S. PATENT DOCUMENTS

| | | | |
|---|---|---|---|
| 3,745,824 | 7/1973 | Mannherz et al. | 73/194 |
| 4,195,515 | 4/1980 | Smoll | 73/861.15 |
| 4,346,604 | 8/1982 | Snook et al. | 73/861.12 |
| 4,454,766 | 6/1984 | Reinhold et al. | 73/861.12 |
| 5,583,299 | 12/1996 | Murase | 73/861.13 |

*Primary Examiner*—George M. Dombroske
*Assistant Examiner*—Max H. Noori
*Attorney, Agent, or Firm*—Michael M. Rickin; Andrew L. Ney

[57] ABSTRACT

An electromagnetic flowmeter comprising a non-conductive body having a central channel, first and second diametrically opposed cavities extending from the channel, and third and fourth cavities positioned, relative to liquid flow through the central channel, upstream and downstream of the first and second cavities, respectively. First and second self-sealing measuring electrodes are respectively positioned in the first and second cavities, and third and fourth self-sealing grounding electrodes are respectively positioned in the third and fourth cavities. Each of the electrodes has a tip and a multiplicity of saw-tooth edges extending outwardly from the periphery of the electrode. Each of the saw-tooth edges has a crest, a face normal to a longitudinal axis of the electrode and extending from the crest to the periphery, and a face at an acute angle to the longitudinal axis of the electrode and extending from the crest to the periphery closer to the tip than where the normal face reaches the periphery. This configuration, in addition to providing a self-sealing effect between the electrodes and the cavities into which the electrodes are inserted, facilitates insertion of the electrodes into the cavities, and hinders withdrawal of the electrodes from the cavities.

6 Claims, 2 Drawing Sheets

ELECTROMAGNETIC FLOWMETER WITH SELF-SEALING ELECTRODES

BACKGROUND OF THE INVENTION

This invention relates generally to electromagnetic flowmeters, and more particularly to an electromagnetic flowmeter having self-sealing electrodes.

The operation of an electromagnetic flowmeter is based on Faraday's law of electromagnetic induction, which is described in detail in U.S. Pat. No. 3,745,824. Applying Faraday's law, a flow rate may be measured by allowing the liquid of interest to be passed through a magnetic field, thereby producing a voltage which can be detected by diametrically opposed electrodes and converted into a flow rate signal. Since the induced voltage is proportional to the average velocity of the liquid, the electromagnetic flowmeter can be calibrated to indicate the volumetric flow rate of the liquid passing through it.

Known electromagnetic flowmeters have a channel through which a liquid is passed, a means for developing a magnetic field across and perpendicular to the direction of liquid flow, and diametrically opposed electrodes with which the liquid makes contact. Because the electrodes must pick up the induced voltage, there must be electrical contact between the electrodes and the liquid. As a result of this required electrode placement, there is the possibility of leakage of liquid around the electrode which can lead to inaccurate flowmeter indications and ultimately flowmeter failure. Consequently, adequate sealing of the electrode must be provided.

Various solutions have been offered for preventing leakage of liquid from the flowmeter channel. These include the use of a sleeve within which the electrode is placed, and screwing the electrode into place with threaded connections. Another arrangement involves inserting a disk, to which the electrodes are attached, between two flanged fittings. None of these arrangements have proven to be sufficiently effective for flowmeters having relatively small channels.

An additional problem with a number of prior art flowmeters is the difficulty of installing the electrodes into the flowmeter. Generally, in the assembly of these prior art flowmeters, more installation steps than desired must be taken.

SUMMARY OF THE INVENTION

An electromagnetic flowmeter that has a non-conductive body. The body has a central channel, first and second diametrically opposed cavities that extending from the channel, and third and fourth cavities that are positioned respectively upstream and downstream of the first and second cavities. The flowmeter also has a means to develop a magnetic field extending through the central channel.

The flowmeter also has first and second self-sealing measuring electrodes positioned in the first and second cavities. There are third and fourth self-sealing grounding electrodes positioned in the third and fourth cavities. Each electrode has a tip; and a multiplicity of saw-tooth edges extending outwardly from the periphery of the electrode. Each saw-tooth edge has a crest, a face normal to a longitudinal axis of the electrode and extending from the crest to the periphery, and a face at an acute angle to the longitudinal axis of the electrode and extending from the crest to the periphery closer to the tip than where the normal faces reaches the periphery.

An electromagnetic flowmeter as described above wherein each of the electrodes are secured within each cavity by cold flow of the body into intimate contact with the saw-tooth edges as the electrodes are positioned in the cavities.

BRIEF DESCRIPTION OF TIE DRAWINGS

DETAILED DESCRIPTION OF THE INVENTION

Figure 1:
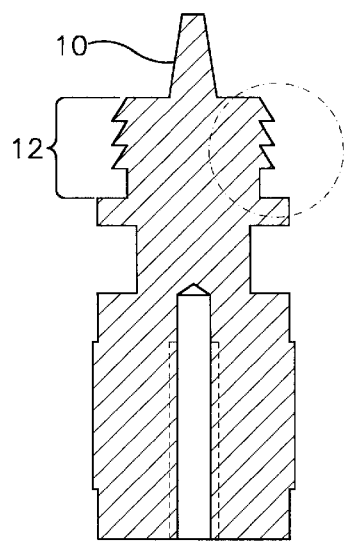
FIG. 1 is a cross sectional view of an electrode constructed in accordance with the present invention.
Figure 1A:
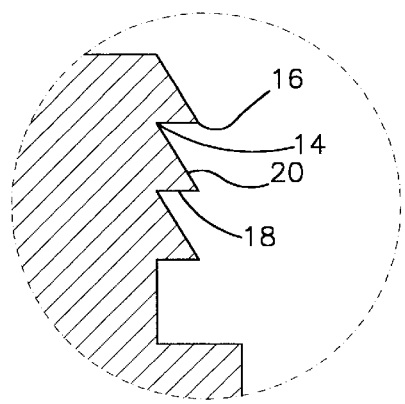
FIG. 1A is cross sectional view, on an enlarged scale, of that portion of the electrode of FIG. 1 within the dashed line circle of FIG. 1.

FIGS. 1 and 1A show a self-sealing electrode constructed in accordance with the present invention. This electrode includes a tip 10, and a multiplicity of saw-tooth edges 12, preferably circular, extending outwardly from a periphery 14 of the electrode. Each saw-tooth edge 12 has a crest 16, a face 18 normal to a longitudinal axis of the electrode and extending from the crest to the periphery, and a face 20 at an acute angle to the longitudinal axis of the electrode which extends from the crest to the periphery closer to the tip 10 than where the normal face reaches the periphery. The saw-tooth edges 12 are sized and shaped to engage a cavity within a plastic material having a diameter approximately half the distance between the crest and periphery diameters of the electrode. By forming the saw-tooth edges 12 at the angles described, insertion of the electrode into a cavity is facilitated, and withdrawal of the electrode from a cavity is hindered. This configuration also seals the electrode within its respective cavity.

Figure 2:
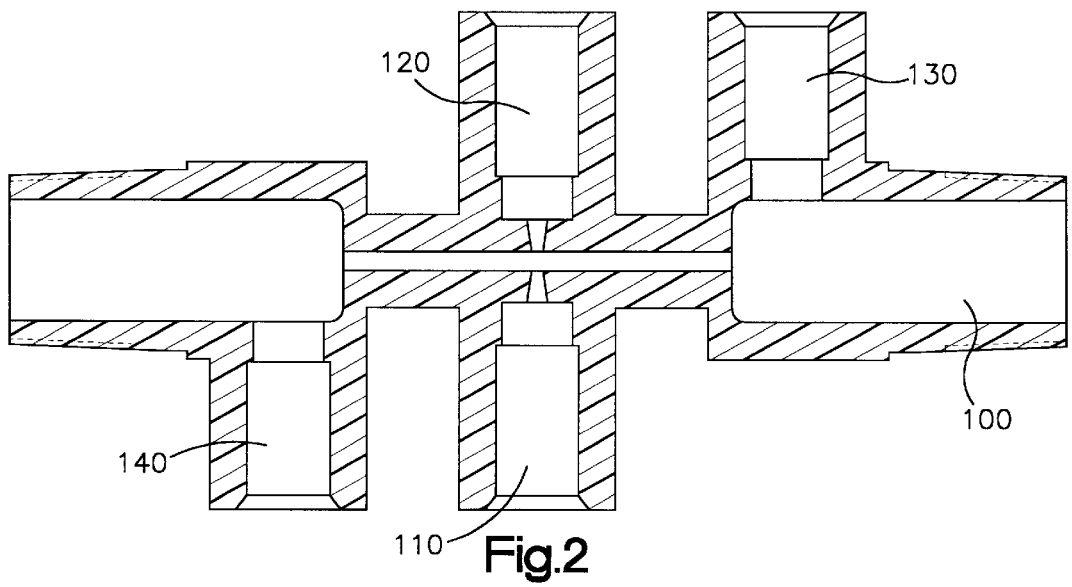
FIG. 2 is a cross sectional view of a flowmeter body constructed in accordance with the present invention.
Figure 3:
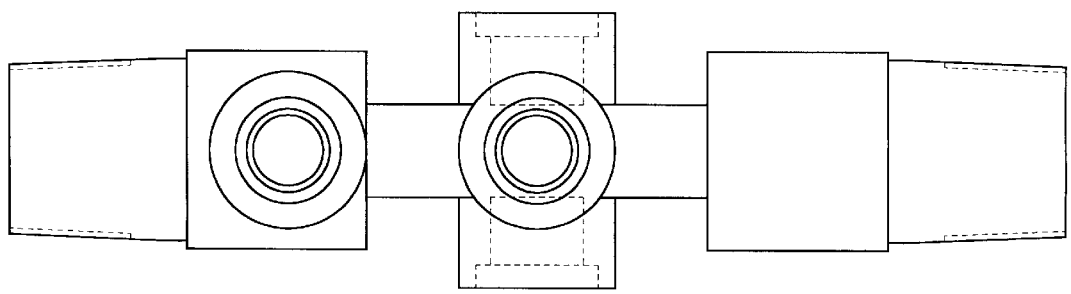
FIG. 3 is a side view of the flowmeter body of FIG. 2.
Figure 4:
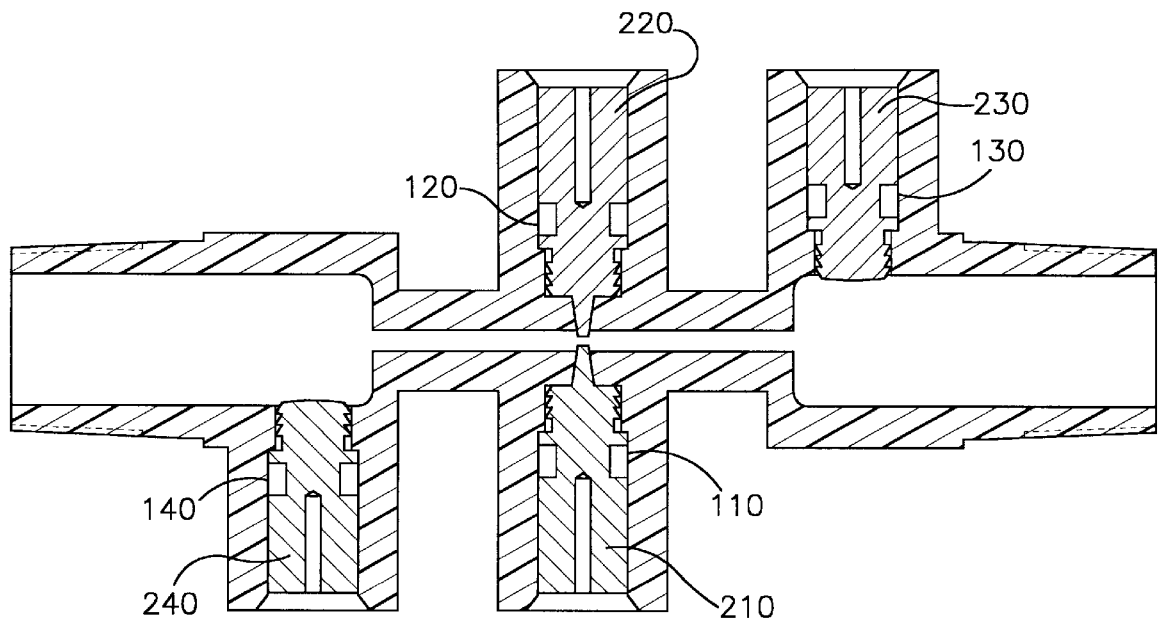
FIG. 4 is a cross sectional view of a flowmeter constructed in accordance with the present invention, with electrodes in place.

A flowmeter constructed in accordance with the present invention is shown in FIGS. 2, 3, and 4. The flowmeter body shown in FIGS. 2 and 3 has a central channel 100, first and second diametrically opposed cavities 110 and 120, respectively, extending from the channel, and third and fourth cavities 130 and 140, respectively. Cavities 130 and 140 are positioned, relative to liquid flow through the central channel, respectively upstream and downstream of the first and second cavities.

FIG. 4 shows the flowmeter body described above with the self sealing electrodes in place. First and second self-sealing measuring electrodes 210 and 220 are respectively positioned in first and second cavities 110 and 120. Third and fourth self-sealing grounding electrodes 230 and 240 are respectively positioned in third and fourth cavities 130 and 140. The cavities 110, 120, 130, and 140 have an initial diameter approximately half the distance between the crest and periphery diameters of electrodes 210, 220, 230, and 240, respectively. This difference in diameter and the saw-tooth configuration on the electrodes facilitates insertion of the electrodes and hinders withdrawal of the electrodes.

Figure 4A:
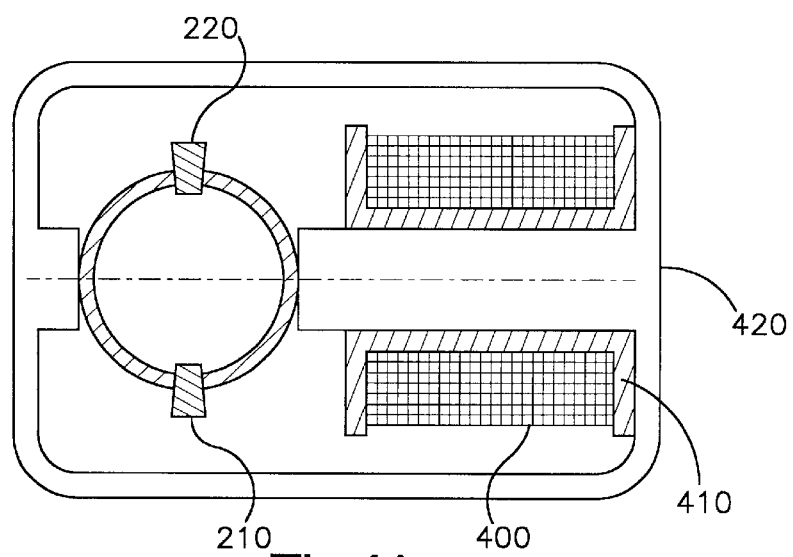
FIG. 4A is a cross sectional view of an apparatus used to provide a magnetic field for the flowmeter according to the present invention.

The flowmeter also has means for developing a magnetic field extending perpendicular to and through the central channel. An example of an apparatus for providing the magnetic field is shown in FIG. 4A. This apparatus includes a conductive wire 400, coiled around a spool piece 410. A current is passed through the conductive wire 400 and the magnetic field generated is focused, via a yoke 420, across central channel 100, perpendicular to both the flow path and the longitudinal axis of the measuring electrodes 210 and 220.

The fact that the configuration of the saw-tooth electrodes facilitates insertion and hinders withdrawal is due to the cold-flow of the plastic material around the saw-tooth edges as they are inserted. Once inserted, there is intimate contact between the crest of the saw-tooth edges and the plastic material of the flowmeter body. With time and increased temperature, the flowmeter body material flows, particularly behind the normal face 18 of the saw-tooth edges, hindering withdrawal of the electrode and sealing the electrode into place. All that is required to insert the electrode into its respective cavity is the exertion of a force on the end of the electrode opposite the tip 10. This will push the electrode into place and the sealing will occur as previously described. Leads or other electrical connections can then be attached to the electrode to complete the electrode installation.

Although the present invention has been described with reference to exemplary embodiments, it is not limited thereto. Rather, the appended claims should be construed to include other variants and embodiments of the invention which may be made by those of ordinary skill in the art without departing from the true spirit and scope of the present invention.

What is claimed:

1. An electromagnetic flowmeter comprising:
   a non-conductive body having:
      (a) a central channel,
      (b) first and second diametrically opposed cavities extending from said channel, and
      (c) third and fourth cavities positioned, relative to liquid flow through said central channel, upstream and downstream of said first and second cavities, respectively;
   means for developing a magnetic field extending through said central channel;
   first and second self-sealing measuring electrodes, respectively positioned in said first and second cavities, and third and fourth self-sealing grounding electrodes, respectively positioned in said third and fourth cavities each of said electrodes having:
      (a) a tip; and
      (b) a multiplicity of saw-tooth edges extending outwardly from the periphery of said electrode and each having:
         (1) a crest,
         (2) a face normal to a longitudinal axis of said electrode and extending from said crest to said periphery, and
         (3) a face at an acute angle to said longitudinal axis of said electrode and extending from said crest to said periphery closer to said tip than where said normal face reaches said periphery.

2. An electromagnetic flowmeter as claimed in claim 1, wherein said saw-tooth edges are circular.

3. An electromagnetic flowmeter as claimed in claim 2, wherein said body is a plastic material and said cavities have a diameter, prior to positioning of said electrodes in said cavities, approximately half the distance between the diameter at said crest and the diameter at said periphery.

4. An electromagnetic flowmeter comprising:
   a non-conductive body having:
      (a) a central channel,
      (b) first and second diametrically opposed cavities extending from said channel, and
      (c) third and fourth cavities positioned, relative to liquid flow through said central channel, upstream and downstream of said first and second cavities, respectively;
   means for developing a magnetic field extending through said central channel;
   first and second self-sealing measuring electrodes, respectively positioned in said first and second cavities, and third and fourth self-sealing grounding electrodes, respectively positioned in said third and fourth cavities, each of said electrodes having:
      (a) a tip; and
      (b) a multiplicity of saw-tooth edges extending outwardly from the periphery of said electrode and each having:
         (1) a crest,
         (2) a face normal to a longitudinal axis of said electrode and extending from said crest to said periphery, and
         (3) a face at an acute angle to said longitudinal axis of said electrode and extending from said crest to said periphery closer to said tip than where said normal face reaches said periphery,
   each of said electrodes secured within each of said cavities by cold flow of said body into intimate contact with said saw-tooth edges as said electrodes are positioned in said cavities.

5. An electromagnetic flowmeter as claimed in claim 4, wherein said saw-tooth edges are circular.

6. An electromagnetic flowmeter as claimed in claim 5, wherein said body is a plastic material and said cavities have a diameter, prior to positioning of said electrodes in said cavities, approximately half the distance between the diameter at said crest and the diameter at said periphery.

* * * * *